O. F. ORNDOFF.
FURROW OPENER ATTACHMENT.
APPLICATION FILED NOV. 11, 1908.
1,046,848.
Patented Dec. 10, 1912.
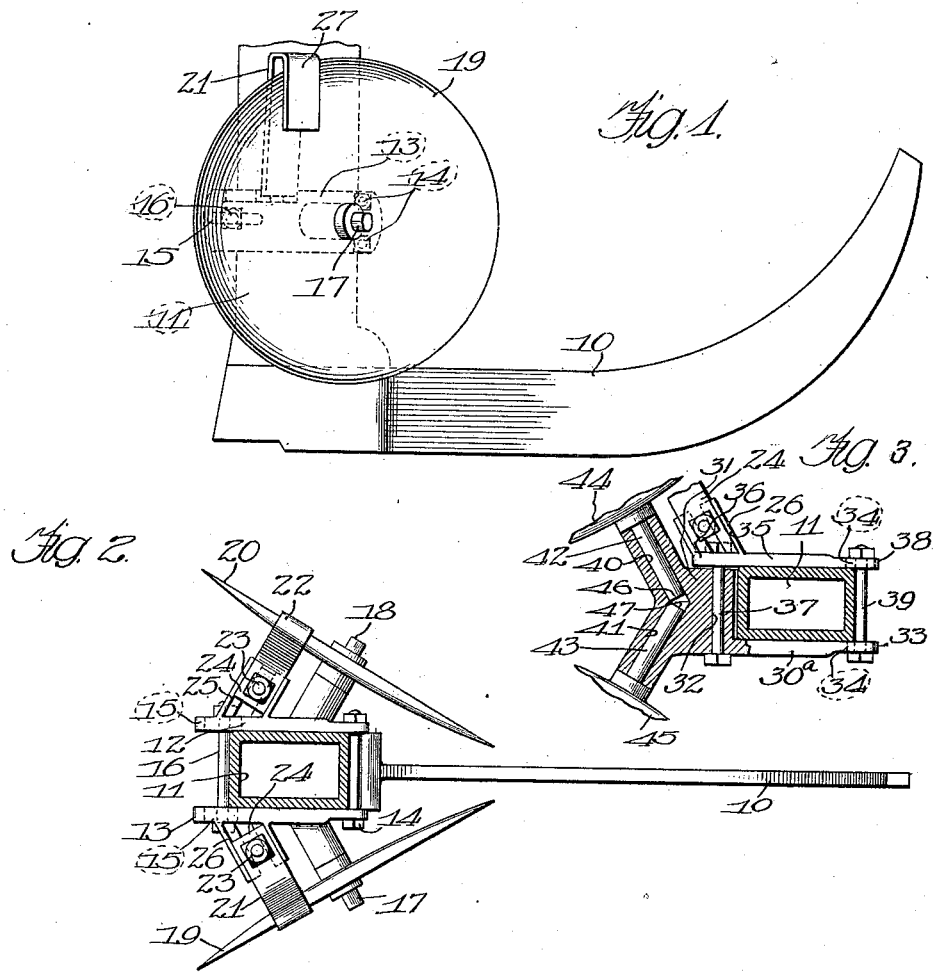

UNITED STATES PATENT OFFICE.

OSCAR F. ORNDOFF, OF COUNCIL BLUFFS, IOWA.

FURROW-OPENER ATTACHMENT.

1,046,848.

Specification of Letters Patent.   Patented Dec. 10, 1912.

Application filed November 11, 1908.   Serial No. 462,073.

*To all whom it may concern:*

Be it known that I, OSCAR F. ORNDOFF, a citizen of the United States, residing at Council Bluffs, in the county of Pottawattamie and State of Iowa, have invented certain new and useful Improvements in Furrow-Opener Attachments, of which the following is a specification.

This invention relates to improvements in furrow opener attachments particularly adapted for use on corn planters or other seeding machines, and the primary object of the invention is to provide improved means whereby the furrow opener may be readily attached or secured to the seed tube to properly position the openers with respect to the shoe or furrow opener of a planting machine.

A further object is to provide improved means whereby the furrow openers may be readily adjusted or positioned with respect to the seed distributing tube and the ground.

A further object is to provide an improved sectional device of this character which may be readily attached either to the seed tube or to the braces or supporting structure for the shoe or tube, whereby the presence of the braces or structure will not interfere with the proper attachment of the furrow opener.

A further object is to provide an improved device of this character which will be simple, durable and cheap in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawing, illustrating the embodiment of the invention, and in which—

Figure 1 is a side elevation of an improved attachment of this character, constructed in accordance with the principles of this invention and showing the furrow opener attached directly to the seed tube. Fig. 2 is a top plan view of Fig. 1 showing the seed tube in section. Fig. 3 is a side elevation similar to Fig. 1 of a modified form of the invention showing the manner in which the furrow opener may be attached to the construction of machines employing braces for the shoe. Fig. 4 is a detail plan view, partly in section, of still another modified form of the invention.

Referring more particularly to the drawing and in the present exemplification of the invention, the numeral 10 designates the ordinary form of shoe of a planter, and 11 designates the seed distributing tube. The seed tube shown in the present exemplification of the invention is shown as being rectangular in cross section, although in many forms of machines to which the present attachment is adapted to be secured, the shape of the seed tube varies.

In the preferred form of attachment, there are provided two members, 12 and 13, preferably in the form of pillow blocks which are similar in configuration and may be of any desired width but preferably of a width to form extended bearing against the face of the seed tube. These members or pillow blocks constitute flanged clamping plates which may be of any desired length but are preferably of a length somewhat greater than the width of the seed tube. One extremity of each of said plates is preferably provided with a plurality of apertures through which suitable fastening devices 14, such as bolts or the like, are adapted to pass when the members 12, 13 are arranged opposite each other and on opposite sides of the seed tubes. The other extremities of each of the clamping plates 12 and 13 are provided with elongated slots 15, through which a suitable fastening device 16, such as a bolt or the like, is adapted to pass for clamping the members 12, 13, to the seed tube. The slots 15 in the members are provided to permit the fastening bolt 16 to be adjusted longitudinally with respect to the members 12 and 13 to permit the attachment to be secured to seed tubes of varying sizes. Each of said clamping plates with the connecting bolts 14 and 16 constitute means for rigidly mounting the oppositely arranged pillow block on the seed tube 11.

Projecting respectively from the outer face of each of the members 12, 13, when the latter are secured in position, are stub axles 17, 18, which, in the exemplification of the invention shown in Figs. 1 to 3, are integral with the respective members 12, 13, and journaled upon these axles 17, 18, are furrow opener disks 19, 20. The axles 17, 18 are arranged at an angle to the face of the respective members 12, 13, and so disposed that when the disks are journaled thereto, the disks will form an acute angle with one another toward the front or forward part of the shoe 10, thereby causing the disks to diverge toward the rear of the shoe for the obvious purpose, as is well known in the art, to cause the furrow to be widened in a gradual manner. These disks 19, 20, may be held against displacement with respect to their axles in any desired or suitable manner. For this purpose the scrapers 21, 22 may be utilized. These scrapers are adjustably held in position or secured to their respective supporting members 12, 13 in any desired or suitable manner, preferably by means of fastening devices 23, such as bolts or the like, which project through an angular portion 24 of the scraper and through slotted projections 25, 26, on the respective members 12, 13. These slotted projecting portions 25, 26 are arranged parallel with the axles 17 and 18 and are located preferably to the rear of the axles.

The body portion of the scrapers 21 project upwardly toward the top of the furrow opener disks 19, 20, and the extremity 27 of the scrapers are bent back upon the body portion and spaced therefrom to form a hook-shaped portion which extends over the peripheries of the respective disks so as to engage and rest against the outer faces thereof. This extremity 27 serves as a scraper and also as a means for preventing the disks from being moved or shifted longitudinally on the stub axles and thereby hold the disks against accidental displacement.

With this improved form of attachment it will be apparent that the furrow disks may be adjusted upwardly or downwardly upon the seed tube to the desired position, in which position they may be secured by tightening the fastening members or bolts 14 and 16.

In the exemplification of the invention shown in Fig. 3 one of the members 30ª may be provided with a laterally extended portion 31 through which any suitable number of apertures 32 pass and this projecting portion 31 is adapted to extend across the front edge of the seed tube. The other extremity 33 of the member 30ª is adapted to project beyond the rear edge of the seed tube and is provided with a slot 34. The coöperating member 35 of the clamp is adapted to rest against the opposite side of the seed tube with one extremity 36 thereof projecting beyond the front edge of the tube 11 and adjacent the laterally extended portion 31. This extremity of the member 35 is provided with a suitable number of apertures passing therethrough which register with the apertures 32 in the laterally projecting portion 31 of the member 30ª, and suitable fastening devices 37, such as bolts or the like, pass through the registering apertures for clamping the members 30ª, 35, together. The laterally projecting portion 31 is of a width slightly less than the width of the tube 11 so that the fastening bolt 37 will cause the forward ends of the members 35, 30ª to clamp the tube.

The extremity 33 of the member 30ª and the extremity 38 of the member 35 which project beyond the rear edge of the tube 11 are provided with slots 34, which register with each other and extend beyond the edge of the tube, and through these registering slots a suitable fastening device 39, such as a bolt or the like, is adapted to pass for assisting in clamping the members to the tube.

The laterally extended portion 31 of the pillow block beyond the forward edge of the tube 11 is provided with diverging sockets or bearings 40, 41 into which the journals or axles 42, 43, of the disks 44, 45, are journaled and in this exemplification of the invention the axles are shown as being secured rigidly to their respective disks. The sockets or bearings 40, 41, have communication with each other so that the extremities 46, 47, of the respective axles may engage and have rolling bearings against each other.

With this improved construction it will be apparent that the furrow openers may be readily attached or detached when desired to or from any form of planting machine and when so attached may be readily adjusted so as to position the furrow openers with respect to the shoe or furrow opener of a planting machine. Furthermore, by providing clamping members, which are of some width, they will have extended bearings against the supporting surface and will thereby overcome all thrust of the disks. It will also be apparent that the disks may be adjusted upon the support to any desired extent with respect to the shoe or runner 10 of the planter so that the upper portion of the opening or furrow made by the shoe and the disks will be of much greater width than the bottom portion of the furrow. This particular form of furrow permits the seed to be deposited into the bottom of the furrow below the enlarged upper portion of the furrow and to be covered while at the same time the furrow will not be entirely filled by the soil used in the first covering of the seed.

It is well known that the roots of the stalk or stem, and corn in particular, sprout therefrom, at or near the surface of the ground and for this reason "hilling" is necessary in the cultivation of the corn to keep the roots covered. In the ordinary manner of planting corn the surface of the ground is left practically level when the corn is first planted and when the corn is "hilled" these hills extend above the surface of the ground, and these hills are not sufficiently large to increase to any great extent the hold of the roots in the ground. With the present invention the top of the furrow is made considerably larger than the bottom and the disks are adjustable so that they may run the desired distance above the point at which the seed is deposited and covered by the planting device and only enough soil is deposited in the furrow to cover the seed. This will leave a furrow opening above the surface of the covering of the seed.

When the seeds sprout and the roots of the plant or stalk come near or above the surface of the soil in the enlarged portion of the furrow, they may be covered by depositing more soil in the enlarged portion of the furrow, thereby causing the stalks to have a firm and secure hold in the ground and below the surface thereof, which is not the case with corn as now planted.

In order that the invention might be fully understood the details of the foregoing embodiments thereof have been thus specifically described, but

What is claimed as new is—

1. In a device of the character described, the combination of a support, two separate and coöperating members engaging opposite faces of the support and extending beyond the support, one of the members being provided with a laterally projecting portion arranged beyond the support and extending across one edge of the support, fastening bolts passing through the said members beyond and in proximity to the support, and diverging disks journaled to one of the members.

2. In a device of the character described, the combination of a support, two separate and coöperating members engaging opposite faces of the support and extending beyond the support, one of the members being provided with a laterally projecting portion arranged across one edge of the support, and fastening bolts passing through the said members beyond and in proximity to the support, said laterally projecting portion being provided with diverging disk bearings adjacent one end of the respective member.

3. In combination with the seed tube and the shoe or furrow opener of a planting machine, a pillow block having an extended face adapted to contact with one face of the seed tube at varying elevations of adjustment thereon and extending laterally beyond the seed tube, a member contacting the opposite side of the seed tube and coöperating with the first recited member, means for securing the pillow block to the seed tube in any of its adjusted positions, the pillow block having a laterally arranged portion beyond the seed tube and extending transversely beyond the inner face of the block, and across the edge of the seed tube, a journal supported by the pillow block and a disk supported by the journal.

4. In a device of the class described, the combination of a support, two separate and coöperating members secured on opposite faces of the support and extending laterally beyond the support, one of the members being provided with a laterally projecting portion arranged beyond the support and extending across one edge of the support, the last recited laterally projecting portion of the member being provided with a journal bearing, a journal supported in the bearing, and a disk secured rigidly to the journal.

5. In a device of the character described, the combination of a support, two separate and coöperating members secured on opposite faces of said support and extending beyond the support, one of the members being provided with a laterally projecting portion arranged beyond the support and extending across one edge of the support, and diverging disks supported by one of the members.

6. In combination with the seed tube and shoe or furrow opener of a planting machine, a support, a pillow block having an extended face adapted to contact with one side of the support, and at varying elevations of adjustment thereon, said block extending laterally beyond the support, a clamping member contacting another side of the support for securing the pillow block to the support in any of the adjusted positions, the pillow block having a laterally projecting portion arranged beyond the support and extending transversely of the edge of the support, said laterally projecting portion of the pillow block supporting diverging journal bearings, rotating axles journaled in the bearings, and disks secured rigidly to the axles.

7. In combination with the seed tube and the shoe or furrow opener of a planting machine, a support extending above the shoe or furrow opener, a pillow block secured to the support at a distance from the shoe or furrow opener, said pillow block being provided with a laterally arranged portion beyond an edge of the support and extending transversely of the support, the laterally arranged portion of the pillow block being provided with diverging journal bearings, rotating axles journaled in the bearings, and concavo-convex disks rigidly secured to the axles and with the concave faces turned forwardly, the planes of the cutting edges of the disks converging forwardly.

8. In a device of the class described, the combination of a support, a pillow block engaging one face of the support and having a laterally projecting portion projecting across the edge of the support, means engaging another face of the support and cooperating with the pillow block for securing the latter to the support and a disk rotatably supported by the pillow block.

9. In a device of the class described, the combination of a support, a pillow block engaging one face of the support and having a laterally projecting portion projecting across the edge of the support, means engaging another face of the support and coöperating with the pillow block for securing the latter to the support and diverging disks rotatably supported by the pillow block.

In testimony whereof I have signed my name to this specification, in the presence of two subscribing witnesses, on this 9th day of November A. D. 1908.

OSCAR F. ORNDOFF.

Witnesses:
J. H. JOCHUM, Jr.,
M. W. CANTWELL.

Copies of this patent may be obtained for five cents each, by addressing the "Commissioner of Patents, Washington, D. C."